United States Patent
Blum et al.

(10) Patent No.: US 8,365,271 B2
(45) Date of Patent: Jan. 29, 2013

(54) CONTROLLING ACCESS OF A CLIENT SYSTEM TO ACCESS PROTECTED REMOTE RESOURCES SUPPORTING RELATIVE URLS

(75) Inventors: Daniel Blum, Stuttgart (DE); Jan Paul Buchwald, Boeblingen (DE); Richard Jacob, Ostfildern (DE); Timo Kussmaul, Boeblingen (DE); Oliver Then, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 12/392,475

(22) Filed: Feb. 25, 2009

(65) Prior Publication Data

US 2009/0217354 A1 Aug. 27, 2009

(30) Foreign Application Priority Data

Feb. 27, 2008 (EP) ..................................... 08151969

(51) Int. Cl.
*H04L 29/06* (2006.01)
(52) U.S. Cl. ............................ 726/12; 713/153; 709/245
(58) Field of Classification Search .................... 726/12; 713/153; 709/245
See application file for complete search history.

(56) References Cited

U.S. PATENT DOCUMENTS

| 7,146,505 B1* | 12/2006 | Harada et al. .................. 713/185 |
| 2002/0095567 A1* | 7/2002 | Royer et al. .................... 713/150 |
| 2003/0037232 A1* | 2/2003 | Bailiff ............................ 713/153 |
| 2005/0198332 A1 | 9/2005 | Laertz et al. |
| 2007/0016613 A1* | 1/2007 | Foresti et al. ............... 707/104.1 |

OTHER PUBLICATIONS

Johns et. al. "RequestRodeo: Client Side Protection against Session Riding", May 31, 2006, OWASP Conference, Leuven, Belgium.*

* cited by examiner

*Primary Examiner* — Kambiz Zand
*Assistant Examiner* — Michael Guirguis
(74) *Attorney, Agent, or Firm* — Patents on Demand P.A.; Brian K. Buchheit; Scott M. Garrett (57) ABSTRACT

A client system is controlled for accessing protected remote resources via a Web Application using a rewriter proxy that supports relative URLs. In one configuration, the Web application can be a Portal application. A URL utility module can be provided for a rewriter proxy that splits an absolute URL into a base part (the URL string up to the resource) and the resource part. A security module computes an authentication identifier for the base part. This can occur by applying a secure hash algorithm and/or secret key. The URL utility module then constructs the rewritten URL by concatenating the URL encoded base part, the authentication identifier, and the resource part as separate path elements.

19 Claims, 11 Drawing Sheets

http://acme.com/somepath/apage.html 41 http://acme.com/somepath/images/imageA.gif 45 http://acme.com/somepath/images/imageB.gif 47

```
<html>
<body>
<h1>Sample page with relative URLs to images</h1>
<h2>First image</h2>
<img src="images/imageA.gif"/>
<h2>Second image</h2>
<img src="images/imageB.gif"/>
</body>
</html>
```

HTML Source Code 43

Rendered HTML page in browser 42

CONTROLLING ACCESS OF A CLIENT SYSTEM TO ACCESS PROTECTED REMOTE RESOURCES SUPPORTING RELATIVE URLS

CROSS-REFERENCE TO RELATED APPLICATIONS

This application claims the benefit of European Patent Application No. 08151969.6 filed 27 Feb. 2008, entitled "Method and System for Controlling Access of a Client System to Access Protected Remote Resources Supporting Relative URLs", which is assigned to the assignee of the present application, and the teachings of which are hereby incorporated by reference in their entirety.

BACKGROUND

The present invention relates in general to Uniform Resource Locator (URL) addressed resources, and more specifically to controlling access of a client system to access protected remote resources supporting relative URLs.

In a typical web application communication scenario, especially a portal application scenario, a user of a client system authenticates himself against the Portal application and receives a portal page with a portlet that contains links to access protected remote resources behind a firewall which are not accessible for the client directly. Therefore a resource proxy has to ensure that all incoming client requests as well as incoming responses from the access protected remote resources are respectively rerouted to their destination.

To achieve this it is a common technique of the rewriter proxy application to detect such links to access protected remote resources in the incoming content provided by the remote application and to rewrite these links in a way that the rewritten URLs point to the rewriter proxy and contain the original remote location as some kind of parameter. The rewritten URLs are then part of the generated content and replace the original URLs. The user of the client system which displays the content which includes these rewritten links sends a request to the rewriter proxy asking to handle the link traversal. In order to serve the request the rewriter proxy gets the original location of the access protected remote resource from the rewritten URL and retrieves the resource content to which the link refers.

The described and commonly used technique of rewriting resource URLs which are handled by a rewriter proxy opens a potential security hole which allows users to access remote applications which are protected by security setups that prohibit the access to the users but grant access to the remote application for the proxy application only. The security hole arises from the fact that most rewriter proxies generate resource URLs in a manner that does not guarantee that a user is not able to create URLs that reference known protected resources and which appear valid and thus are served by the proxy application. Often the location of the access protected remote resource is simply encoded in the generated resource URL in plain text. An attacker knowing the location of an access protected remote resource of interest can inspect the content for a valid rewritten resource URL and can change the value of the resource location parameter to the location of the protected resource he wants to retrieve. The modified resource URL can then be used to send a request to the rewriter proxy to retrieve the access protected remote resource. Thus, the attacker can use the rewriter proxy to tunnel through the firewall.

Another problem of the described commonly used technique is the reliability of the link detection. References to other remote resources are represented by URLs that define the address where the resource is located. This address can be defined absolute or relative to the URL of the base document where the resource is referenced. Absolute URLs can be quite easily detected and rewritten by searching the content of a resource for URL expressions starting with a valid protocol followed by a proper host name (e.g., http://somehost.com/somepath). For relative URLs, this is more difficult and usually solved by using detection rules for particular content dependant constructs such as references in link or image tags in HTML. This kind of detection process for relative URLs is costly and the quality of its result depends on a complete set of detection rules, as it is not able to detect references that do not match to one of the defined detection rules.

BRIEF SUMMARY

In one embodiment, a response can be received from an access protected remote resource in response to a client request to the access protected remote resource. The access protected remote resource is configured in such a way that the client system is not allowed to directly access the access protected remote resource but all client requests are rerouted via the web application which is authorized to access the access protected remote resource. All references that are defined by absolute URLS and point to access protected remote resources can be identified within responses. A rewritten URL replaces each original URL of the identified reference to an access protected remote resource. Generation of the rewritten URL can occur by splitting the original URL into a base part and a resource part, by generating an authentication identifier by applying an authentication method to at least the base part, and by concatenating the URL of the web application, the base part, authentication identifier, and resource part. The original URL of the references contained in the response can be replaced by the rewritten URL including the authentication identifier. The response including rewritten URL and authentication identifier can be sent to the client system. When the client system triggers said rewritten URL, the web application extracts the base part and authentication identifier from the URL and verifies the authentication identifier by applying the same authentication method on the base part in order to ensure that the base part has not been changed. Only if the authentication identifier is verified correctly, the web application builds the full resource URL from the rewritten URL and returns the respective resource to the client system.

In one embodiment, a system server can include a Web application, a set of communication links, a rewriter proxy, a URL utility module, and a security module. The Web application can run on the server system in a client-server environment. One communication link can be to a client system. Another communication link can access protected remote resource allowing communication of the Web application with the access protected remote resource. The rewriter proxy can identify references to absolute URLs in the response from the access protected remote resource pointing to access protected remote resources, can generate a rewritten URL for each such reference including the URL of the rewriter proxy, and can replace the original URL of the reference in the response by the rewritten URL. The URL utility module can split the original URL into a base part and a resource part and concatenating the base part, an authentication identifier, and the resource part to the rewritten URL before the original URL is replaced by the rewritten URL. The URL utility module can also split each URL of each client request into the base part, the authentication identifier, and the resource part to validate the authentication identifier for at least the base part. The URL of the remote resource can be created from the base part and the resource part. The security module can generate an authentication identifier by applying an authentication method to at least the base part and can return the authentication identifier to the URL utility module, and can validate the authentication identifier for at least the base part, returning the validation result to the URL utility module. The Web application can provide the response including the rewritten URLs to the client system.

DETAILED DESCRIPTION

One embodiment of the present invention to provide a method, system, computer program product, and apparatus for controlling access of a client system to access protected remote resources via a Web Application using a rewriter proxy that supports relative URLs avoiding disadvantages of the prior art. In one configuration, the Web application can be a Portal application.

More specifically, one embodiment of the present invention provides a URL utility module for a rewriter proxy that splits an absolute URL into a base part (the URL string up to the resource) and the resource part. A security module computes an authentication identifier for the base part. This can occur by applying a secure hash algorithm and/or secret key. The URL utility module then constructs the rewritten URL by concatenating the URL encoded base part, the authentication identifier, and the resource part as separate path elements.

When a client activates one of those rewritten URLs, a request is sent to the rewriter proxy. Before a connection to the access protected remote resource is established, the URL utility module extracts the base part and the authentication identifier from the rewritten URL and passes these elements to the security module. The security module validates whether the base part has been changed. This is accomplished by applying the same secure hash algorithm and/or the same secret key to the base part in the client request. If the calculated authentication identifier matches with the authentication identifier contained in the client request, the URL utility module computes the full resource URL from the base part and the resource part and returns it to the rewriter proxy that connects to the access protected remote resource. This embodiment of the invention enables a rewriter proxy to generate URLs to access protected remote resources in a way that does not allow users to access remote resources other than those referenced by links which have passed the rewriter proxy rewriting mechanism, or those that are referenced by such remote resources using relative URLs.

As used herein, a rewriter proxy can be defined as a component which routes incoming user client requests to access protected remote resources as well as processes and modifies the returned content so that links point to the rewriter proxy instead of the access protected remote resource.

An access protected remote resource can refer to any resource that provides content that is protected against unauthorized access (e.g., by using a firewall).

Figure 1:
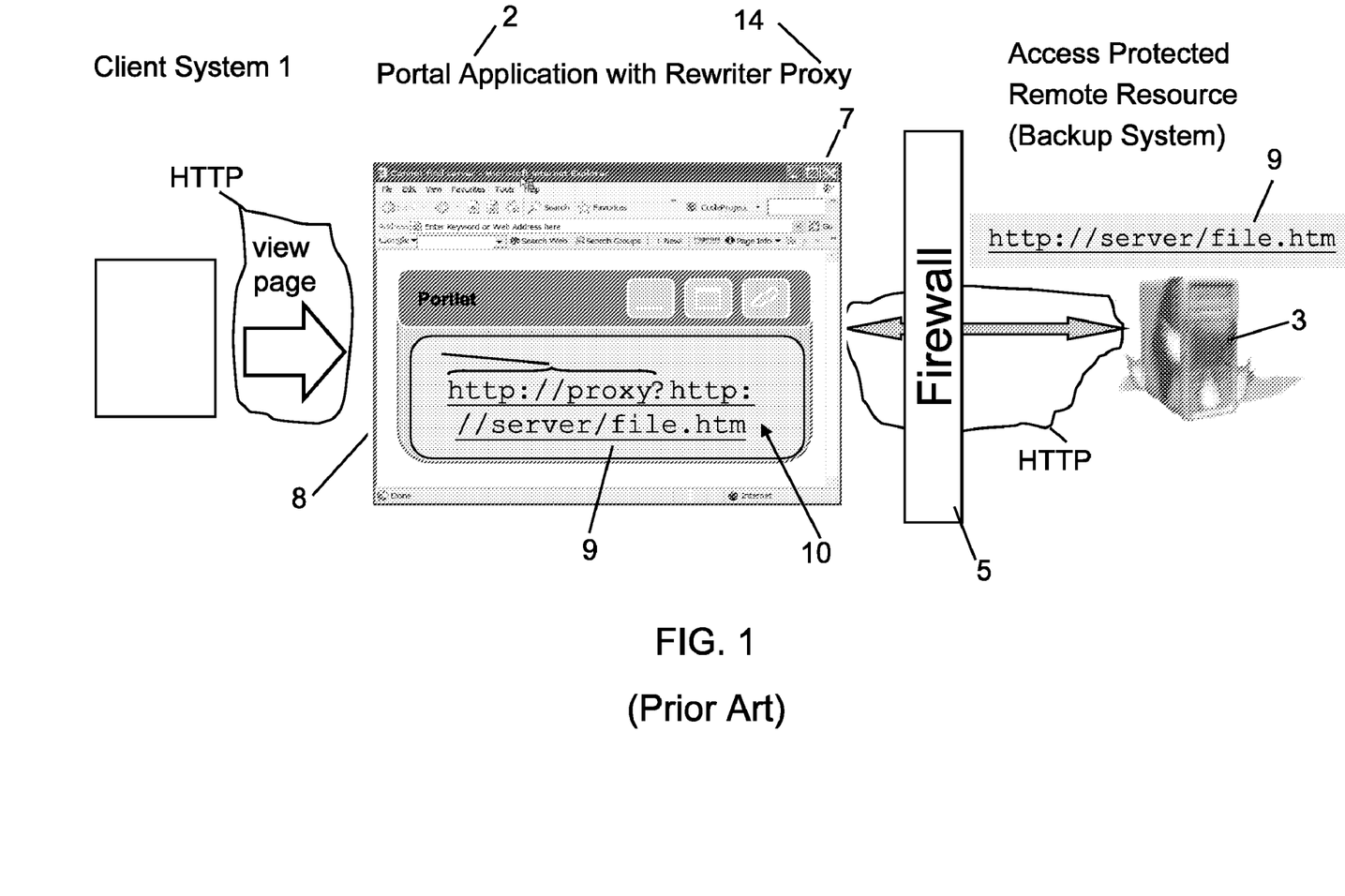
FIG. 1 shows the general prior art communication flow between client-system, Portal Application using rewriter proxy, and access protected remote resource.

With respect to FIG. 1, there is shown a prior art communication process between client-system 1, Portal Application 2 using rewriter proxy 14, and access protected remote resources 3. For example access protected remote resources 3 are databases, transaction systems, syndicated content provider, remote web sites which are connected with the Portal application by network (e.g., Internet). Access protected remote resources 3 mean that a user client cannot directly access remote resources but all user requests are rerouted via the rewriter proxy 14 to the access protected remote resources 3 (e.g., access protected remote resources are secured by a Firewall). The communication process begins with a client request to a Portal Application 2. After successful authentication, the Portal Application 2 provides a first Portal Page 7 to the client-system 1. All links included in that Portal Page 7 that provide access to access protected remote resources 3 are rewritten by the rewriter proxy 14 insofar that the original URL 9 pointing to the access protected remote resource 3 is replaced by the URL of the rewriter proxy 14. Usually, the original URL 9 is added as a parameter in that rewritten URL 10. When the user of the client-system 1 activates a link included in the Portal Page 7, a request including the rewritten URL 10 is sent to rewriter proxy 14 that reads the rewritten URL 10 and extracts the URL 9 of the access protected remote resource 3. Then the rewriter proxy 14 connects to the access protected remote resource 3 and subsequently rewrites all the URLs 9 received from the access protected remote resource 3.

Figure 2A:
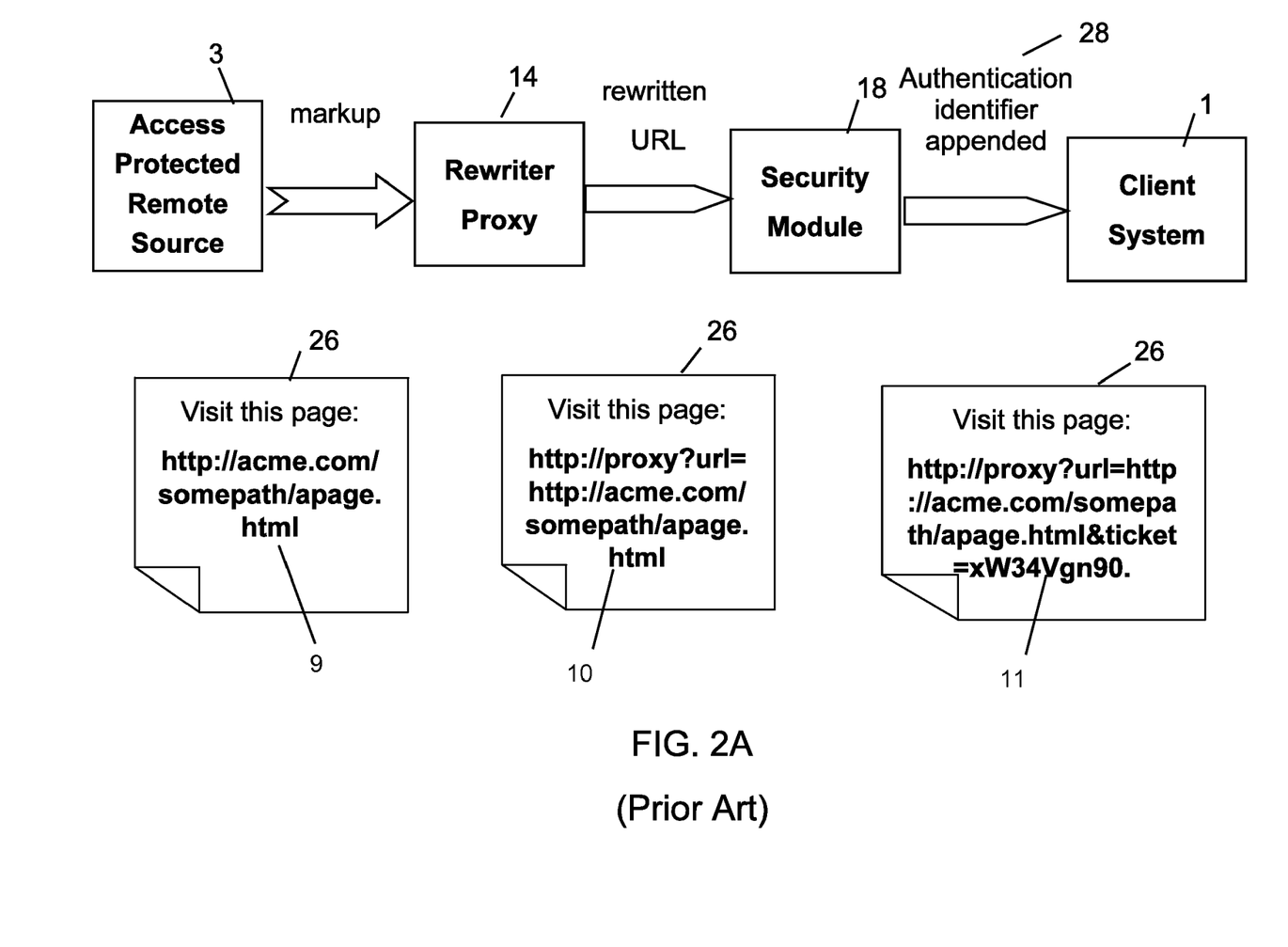
FIG. 2A shows a diagram of the prior art communication flow from the access protected remote resource to client system.

FIG. 2A shows the prior art flow from the access protected remote resource 3 to the client system 1. A link in the markup 26 originally points to a URL 9. The rewriter proxy 14 detects this URL and rewrites it to a rewritten URL 10 pointing to the rewriter proxy and appending the original address as a parameter. The rewritten URL 10 is passed to the security module 18 that appends an authentication identifier to said URL, which results in the protected rewritten URL 11 that is finally used to replace the original URL 9 in the markup 26 delivered to the client system 1.

Figure 2B:
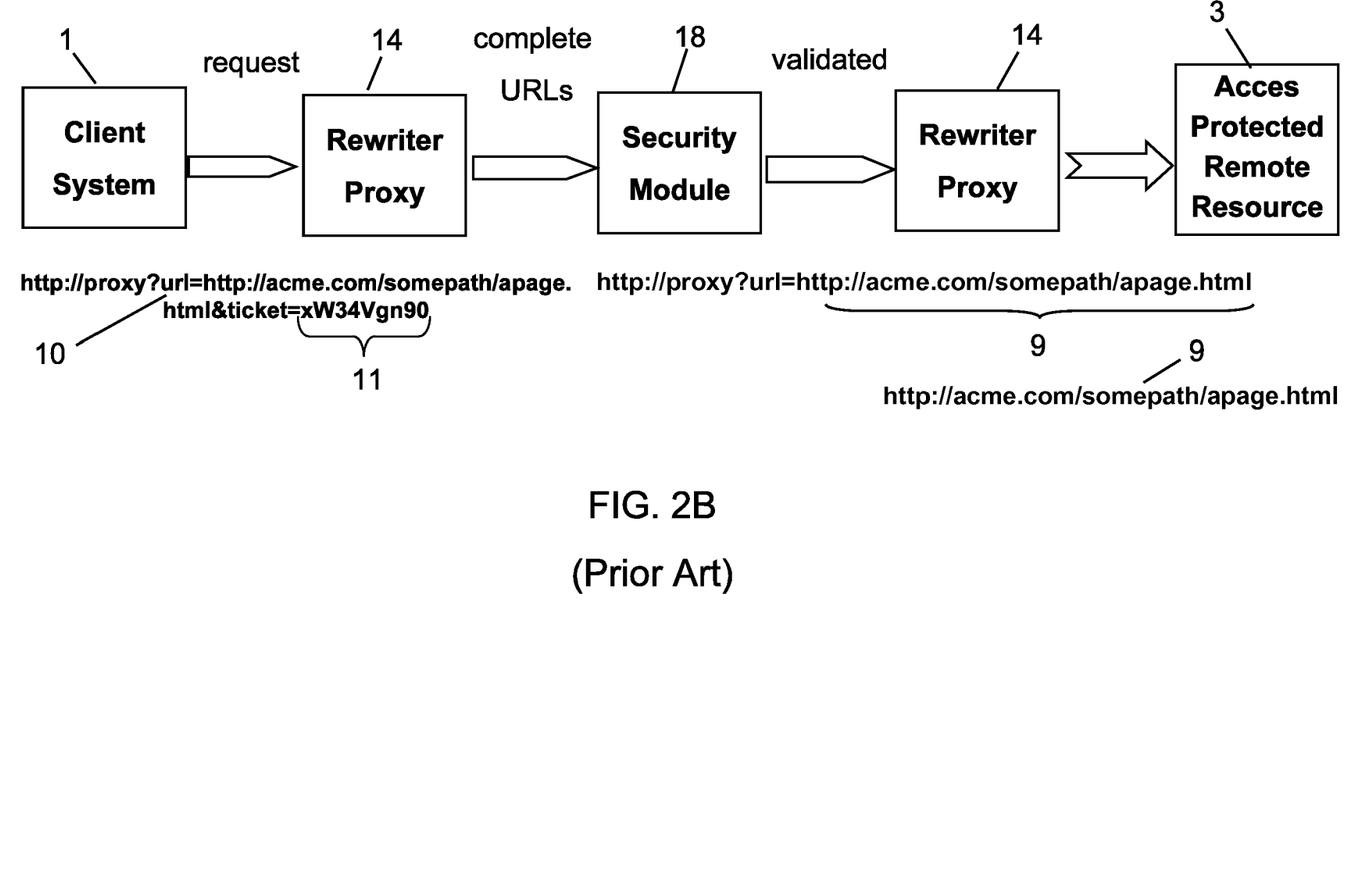
FIG. 2B shows the diagram of the prior art communication flow from the client system to an access protected remote resource.

FIG. 2B shows the prior art flow from the client system 1 to the access protected remote resource 3. When the client system 1 requests the rewritten URL 10, the request is handled by the rewriter proxy 14. The rewriter proxy 14 passes the URL to the security module 18 that extracts the original URL 9 as well as the authentication identifier 11 and validates whether the authentication identifier is accurate. If this validation is successful, the rewriter proxy 14 loads the access protected remote resource 3 addressing it by the original URL 9 and delivers the response to the client system 1.

Figure 3A:
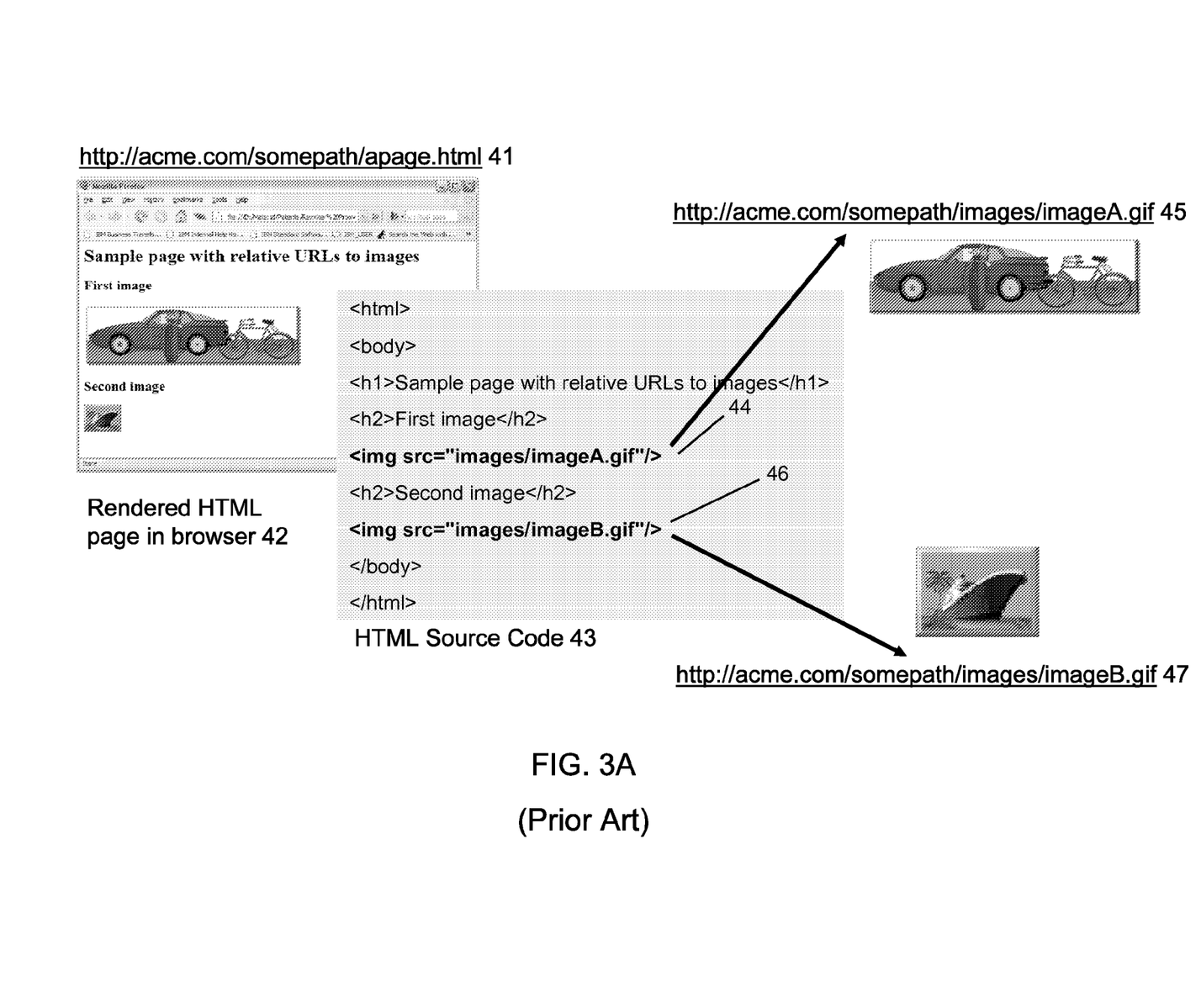
FIG. 3A shows the prior art functionality of relative URLs contained in the markup of an HTML page displayed in a browser.

FIG. 3A shows the general prior art functionality of relative URLs. An HTML page addressed by an absolute URL 41 is rendered in a browser 42. The process of rendering the page basically consists of the interpretation of the HTML source code 43 of the page by the browser in order to display all contained HTML elements according to the HTML specification. Such elements can reference other resources that need to be loaded by the browser in separate requests. This is, for example, the case for images embedded in an HTML page. The sample page in FIG. 3A contains an image element 44 pointing to a source element "images/imageA.gif". As this does not denote a complete address to a remote resource, the browser must handle this information as a URL being relative to the location of the base document 41. This way the actual URL of the image file 45 can be constructed by the browser to load the image from this location. In the same way the second image element 46 can be resolved to the remote address 47.

Figure 3B:
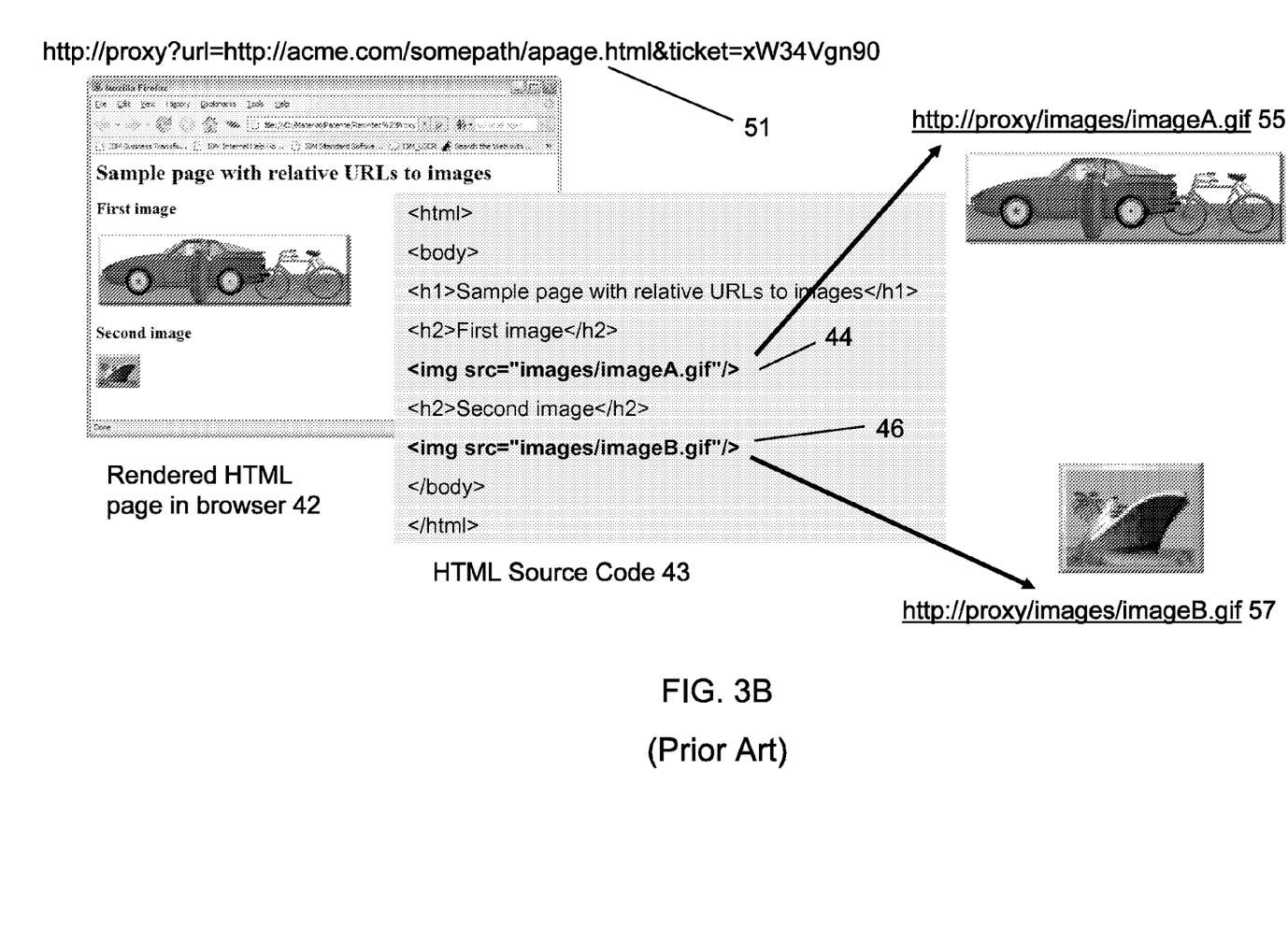
FIG. 3B shows the problem that occurs for the prior art solution with a resource making use of relative URLs as described in FIG. 3A.

FIG. 3B shows the problem that occurs for the prior art solution when trying to resolve relative URLs. If the base document 42 is served by the resource proxy, it is addressed by the rewriter proxy URL 51. The relative URLs 44 and 46 in the HTML source code of the page 43 are now resolved relative to the base address 51, which results in the URLs 55 and 57. These do neither contain any information about the original URL nor an authentication identifier and thus cannot be handled by the rewriter proxy.

Figure 4:
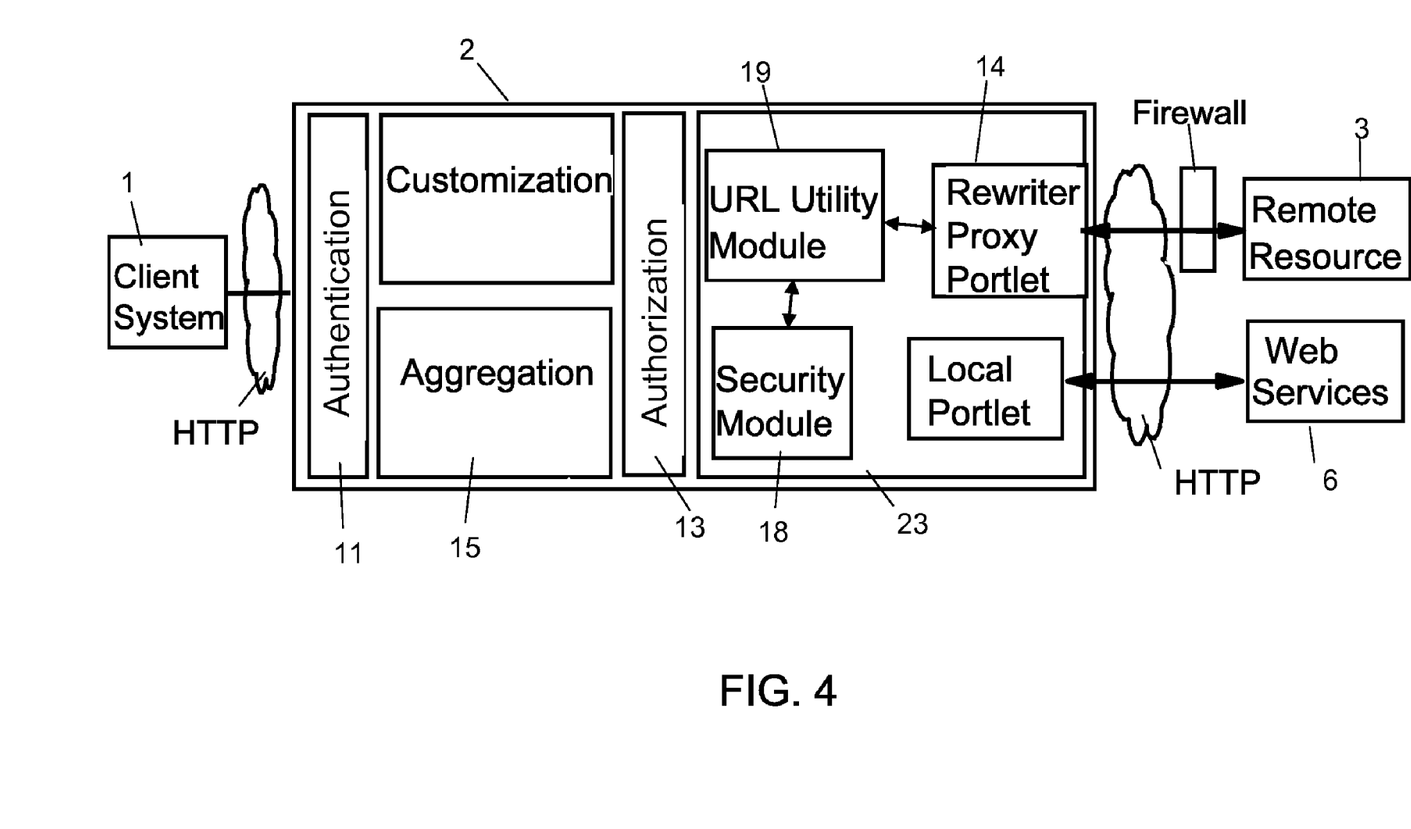
FIG. 4 shows one implementation of the inventive URL utility module combined with the security module in a Portal application using a rewriter proxy.

FIG. 4 shows preferred implementation of the inventive URL utility module 19 combined with a security module 18 in a Portal application 2 using a rewriter proxy 14. A Portal application 2 in an embodiment of the present invention may be defined as a Web application which provides a secure, single point of interaction with diverse information, business processes, and people, personalized to a user's needs and responsibility.

Portal applications 2 as used in one embodiment of the present invention implements the standard functionality such as security, authorization 13, authentication 11, aggregation 15, caching, user management, enrolment, rendering, and rewriter proxy functionality for granting access to access protected remote resources 3. This portal architecture includes preferably APIs (Portlet Container) 23 for the integration of applications so that applications from different partners can be used as long as they match the Portal product's API. In the Portal environment, these applications are typically called Portlets. The rewriter proxy 14 is preferably implemented as a Portlet. Typically such Portal Applications 2 run in an application server environment.

The inventive URL utility module 19 provides at least an interface to the rewriter proxy Portlet 14. As already explained in detail, the rewriter proxy 14 which is allowed to access the access protected remote resources 3 has to ensure that all incoming user client requests are respectively rerouted to their destination. For that purpose, the rewriter proxy 14 detects all absolute URLs contained in the content (e.g., markup) provided by access protected remote resources and passes them to the inventive URL utility module 19. The URL utility module 19 is responsible for generating the according rewritten URLs, which will be described in detail in the following figures. After generating the rewritten URLs, the URL utility module 19 returns said rewritten URLs to the rewriter proxy 14 in order to replace the original URLs.

A reasonable implementation approach for the URL utility module 19 could be a streaming mechanism where the rewritten URLs are written to an output stream provided by the rewriter proxy 14.

When an end-user interacts with the generated markup and activates an access protected remote resource URL, the request traverses the following steps through the components.

The rewriter proxy 14 passes on the incoming resource URL to the URL utility module 19. The latter validates the requested URL and, on success, reconstructs the original URL and passes the location of the resource to the rewriter proxy 14 which then fetches the access protected remote resource on behalf of the end-user.

Again a streaming mechanism symmetric to the mechanism that has been used to generate the resource URL would be a good implementation approach. Here an input stream is built from the secured resource URL and used to validate or decrypt the URL. The rewrite proxy 14 reads the access protected remote resource location from the input stream provided by the URL utility module 19 or receives an error.

Figure 5:
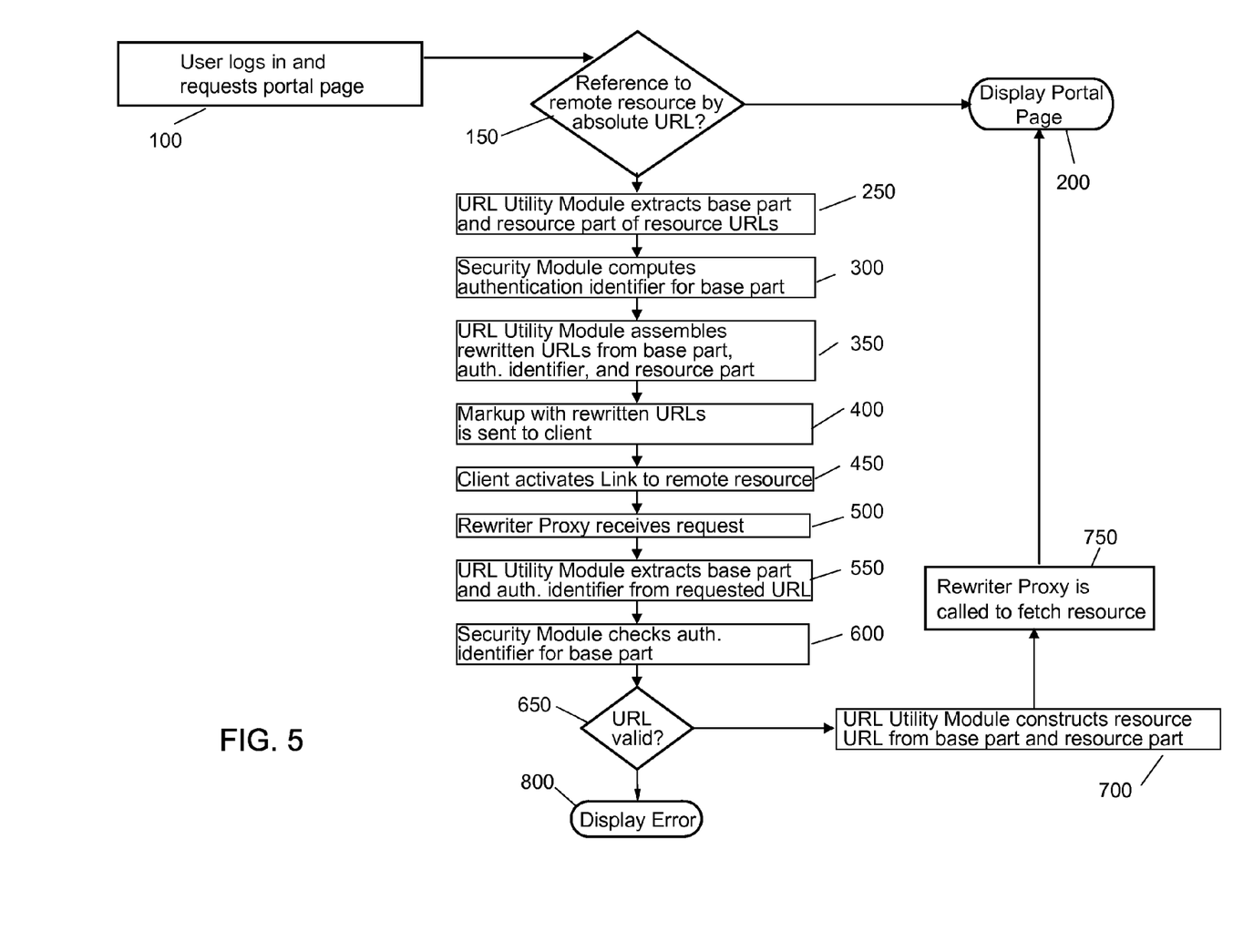
FIG. 5 shows a diagram of the overall communication flow between client-system, portal application using rewriter proxy, inventive URL utility module, security module, and access protected remote resources.

FIG. 5 shows a diagram of the overall communication flow between client-system, portal application with rewriter proxy, inventive URL utility module, security module, and access protected remote resource.

The user logs in to the portal by authenticating itself and is authorized to view a portal page with at least one portlet 100.

It is checked if any portlet on that page contains links to access protected remote resources (where access protection is e.g., accomplished via a firewall) that are represented by absolute URLs 150.

If this is not the case the page is displayed 200.

If this is the case, the rewriter proxy passes the detected absolute URLs to the URL utility module that extracts the base part and resource part of all those resource URLs 250.

The security module computes an authentication identifier for the base part of each resource URL 300.

The authentication identifier can be computed by the following specific implementations:

In a first implementation, simply a hash algorithm is applied to original URL and its result is appended to the rewritten URL as a parameter.

In second implementation, a secret key is applied to the original URL and its result is appended to rewritten URL as a parameter.

In a third implementation, a secret key is applied to the original URL and a hash function is applied to its result and its final result is appended to the rewritten URL as a parameter.

In a fourth implementation, a symmetric encryption algorithm is applied to the original URL and its result replaces the original URL in the rewritten URL.

The URL utility module then assembles the complete rewritten URLs from the base part, authentication identifier, and resource part, and returns the rewritten URLs to the rewriter proxy 350.

The rewritten and secured resource URLs are used to replace the original URLs in the markup that is sent to the client 400.

The user's client activates the rewritten URL pointing to the access protected remote resource 450.

The rewriter proxy receives the request and reads the requested URL which is then passed to the URL utility module 500.

The URL utility module extracts the base part, authentication identifier, and resource part from the requested URL and passes the base part and the authentication identifier to the security module 550.

The security module validates the authentication identifier for the base part depending on the specific implementation used for computing the authentication identifier as follows 600:

In first, second, and third implementation cases, the same method for computing the authentication identifier as described above has to be repeated and the result is compared with authentication identifier contained in the rewritten URL. If they match, the URL utility module reconstructs the complete original resource URL from the base part and the resource part 700. It then provides the original URL to the rewriter proxy that grants access to the access protected remote resource 750. If the access protected remote resource contains absolute URLs to access protected remote resources the same inventive method as described is applied again.

In the last implementation case using encryption algorithm, the corresponding decryption algorithm has to be applied to the authentication identifier. If decryption is successful, steps 700 and 750 are executed as described in the previous paragraph.

In case the validation of the authentication identifier fails no access to the access protected remote resource is allowed 800.

Figure 6A:
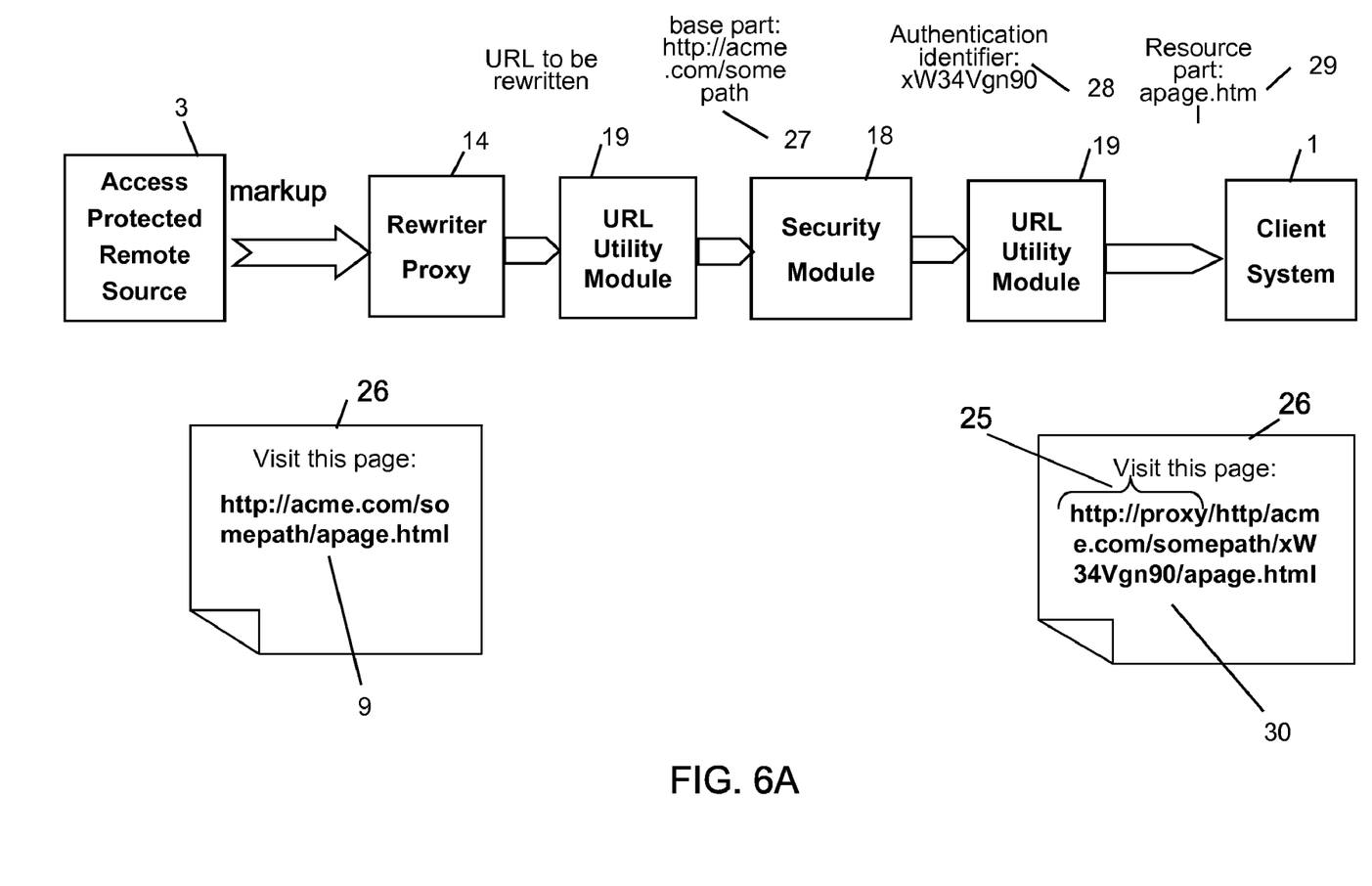
FIG. 6A shows a diagram of the communication flow from the access protected remote resource to client system when using an embodiment of the present invention.

FIG. 6A describes the detailed flow from the access protected remote resource 3 to the client system 1. The markup 26 of the access protected remote resource 3 contains a link to another remote resource that is addressed by an absolute URL 9. The rewriter proxy 14 detects this link and calls the URL utility module 19 to rewrite the original URL 9. The URL utility module 19 splits the original URL 9 and passes the base part 27 to the security module 18. The security module computes the authentication identifier 28 of the base part 27 and passes the result back to the URL utility module 19. The URL utility module 19 concatenates a proxy prefix 25, base part 27, authentication identifier 28 and resource part 29 to the complete rewriter proxy URL 30. This URL is used to replace the original URL 9 in the markup 26 delivered to the client system 1.

Figure 6B:
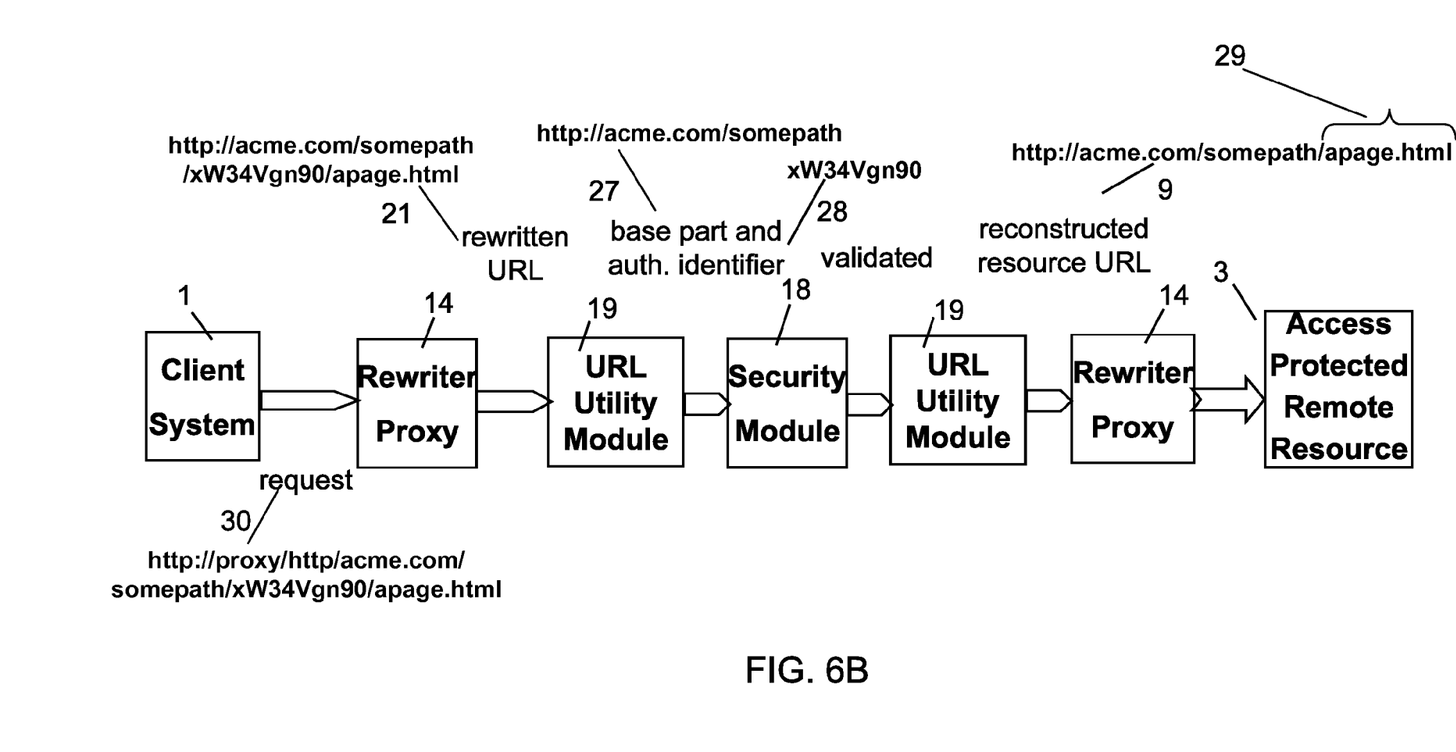
FIG. 6B shows the diagram of the communication flow from the client system to an access protected remote resource when using an embodiment of the present invention.

In FIG. 6B, the URL to the rewriter proxy 30 as generated in the flow of FIG. 6A is requested by the client system 1. The request is routed to the rewriter proxy 14 that extracts the rewritten URL 21 from the request URL 30. The rewriter proxy 14 passes URL 21 to the URL utility module 19 that extracts the base part 27 and the authentication identifier 28. The two elements 27 and 28 are passed to the security module 18 that validates whether the authentication identifier 28 for the base part 27 is correct. If the validation is successful, the URL utility module 19 reconstructs the original resource URL 9 by appending the resource part 29 to the base part 27. This URL is passed back to the rewriter proxy 14 that connects to the remote resource 3.

Figure 6C:
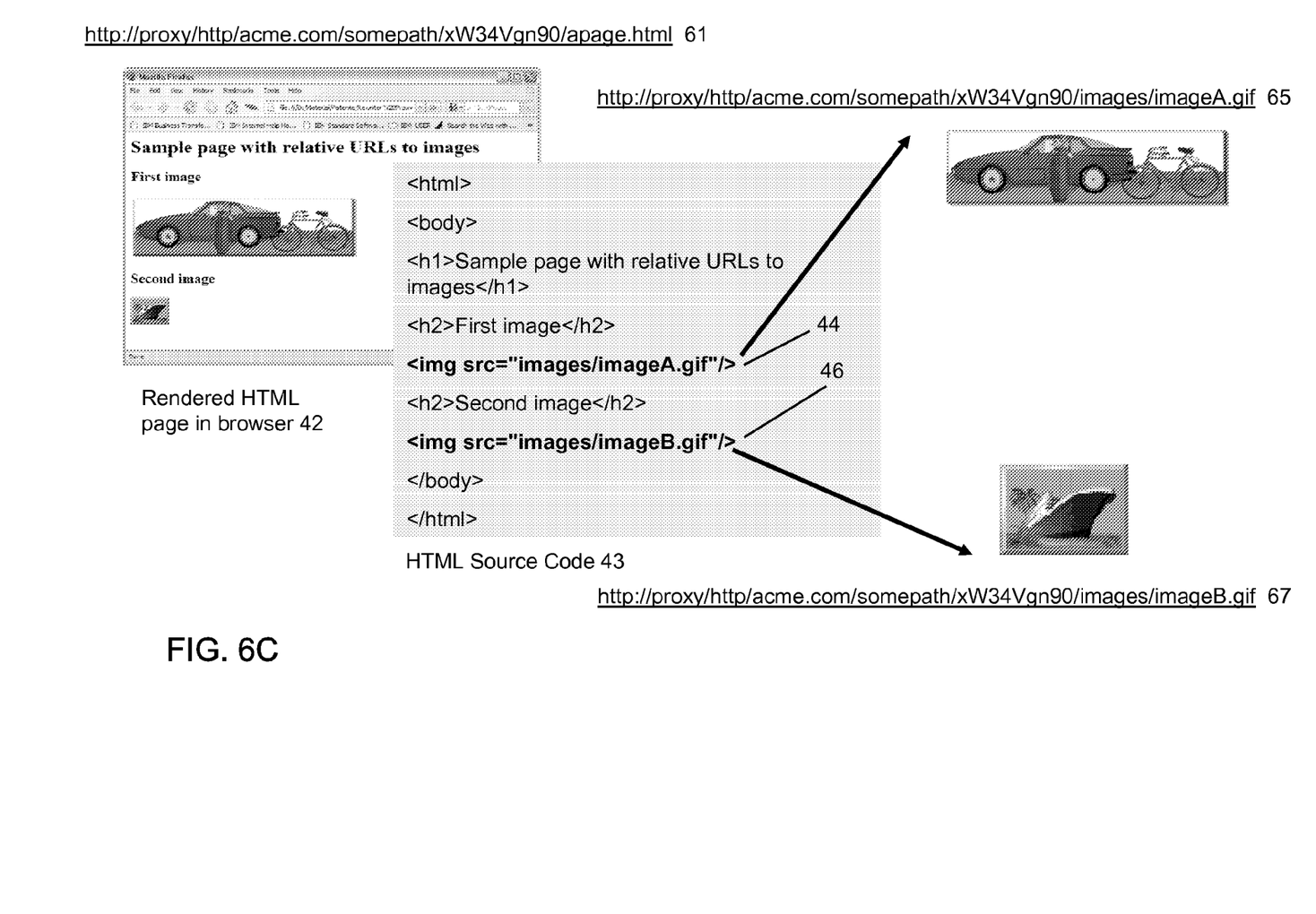
FIG. 6C shows how the addresses of relatively referenced resources are resolved when using an embodiment of the present invention.

FIG. 6C repeats the example of FIG. 3B with the difference that the base HTML page 42 is now addressed by using the rewriter proxy with a URL format according to one embodiment of the present invention, which results in the URL 61. As the relative references to the images 44 and 46 in the HTML source code 43 are handled relative to the base location 61, the browser now tries to load the images from the addresses 65 and 67.

Figure 6D:
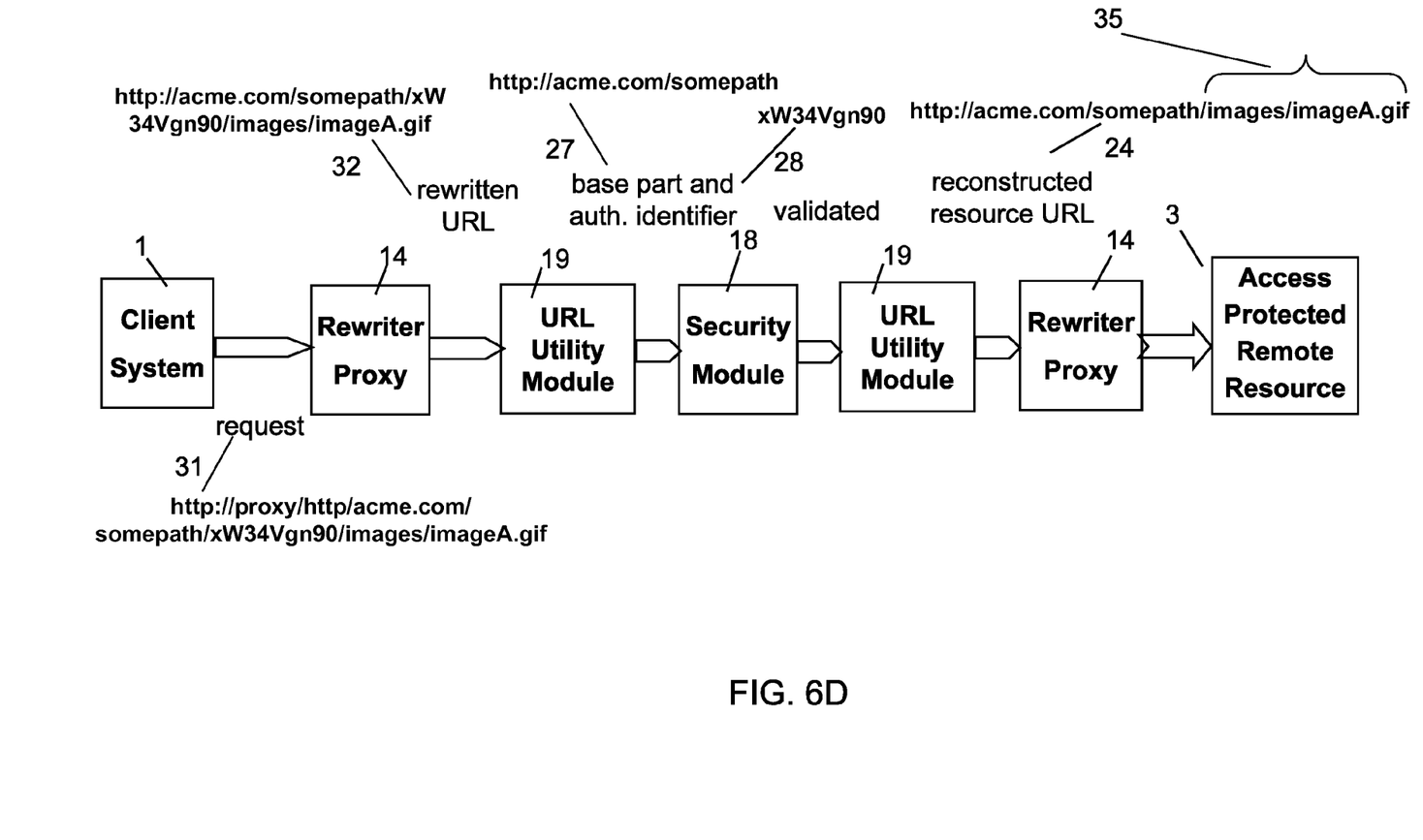
FIG. 6D shows the diagram of the communication flow from the client system to another access protected remote resource relative to the original resource when using an embodiment of the present invention.

FIG. 6D shows how the request to the first image in FIG. 6C is handled when using the present invention. The flow is the same as in FIG. 6B with the difference that the resource part 35 is now the relative reference to the image file. As the base part 27 did not change, the security module 19 can still successfully validate the authentication identifier 28, and the complete resource URL 24 is correctly reconstructed to point to the actual remote resource (see item 45 in FIG. 3A).

The present invention is not limited to the previously described format of the rewritten URLs. In alternative embodiments, the base part and/or the authentication identifier can be encoded in any URL safe format (e.g., Base64) and/or compressed. This implies the respective decompression and/or decoding before validating the authentication identifier and reconstructing the original URL.

In another alternative embodiment, the base part is extended by additional parameters. These parameters can comprise, but are not limited to: (A) All or particular query parameters from the original URL (e.g., parameters that are needed for session maintenance). (B) Proxy specific parameters that control the behavior of the rewriter proxy (e.g., switch on or off whether resources loaded by the rewriter proxy again need to be rewritten or not).

This extension can be achieved by representing the base path up to the resource and all additional parameters within one URL safe string, e.g., an encoded XML string. This string is taken as the base part. For incoming requests, the URL utility module decodes the string and parses it to distinguish the base URL path and the parameters. In addition to the previously described logic, this alternative embodiment requires the appropriate handling of the additional parameters. Query parameters from the original URL need to be appended to the resource part as a query string, and proxy specific parameters need to be passed to the rewriter proxy to control its behavior.

In a further alternative embodiment, the authentication identifier can be extended by a nonce and/or a timestamp to improve security. A nonce is generated randomly at the time of creation of the authentication identifier and added as a part of the latter. Besides comparing the hash or decrypted result, the security module validates that the nonce has been generated by the security module itself and has not been manipulated. A timestamp of the current system time (e.g., a date) is preferably added by the security module before applying the hash method or encryption to the base part. If an incoming request is validated, the current timestamp is used for validation. If the current system time has been progressing over the chosen period of a timestamp, the validation fails and the request is rejected. This allows creating rewriter proxy URLs that are only valid for a particular timeframe (e.g., an hour or a day).

In another alternative embodiment, access to protected remote resources that are referenced by relative URLs from other protected remote resources can be restricted or limited. This requires an additional configuration module that enables an administrator to control which resources can be accessed. Such a configuration can be based on, but is not limited to: (A) Pattern matching for the resource part (e.g., file extension patterns, file name convention based patterns). (B) List of all resources that are or are not accessible by relative references.

In this alternative embodiment, the URL utility module, after successful validation of the authentication identifier, additionally checks said configuration module whether the current resource can be accessed or not, and rejects the request if this is not the case.

Embodiments of the present invention can be realized in hardware, software, or a combination of hardware and software. A tool, according to one embodiment of the present invention, can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general-purpose computer system with a computer program that, when being loaded and executed, controls the computer system such that it carries out the methods described herein.

Embodiments of the present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following: (A) conversion to another language, code or notation; and, (B) reproduction in a different material form.

The invention claimed is:

1. A method for controlling access of a client system to access protected remote resources comprising:
   receiving a response from an access protected remote resource in response to a client request to said access protected remote resource, wherein said access protected remote resource is configured in such a way that a client system is not allowed to directly access said access protected remote resource but all client requests are rerouted via a web application which is authorized to access said access protected remote resource;
   identifying in said response all references that are defined by absolute URLs and point to access protected remote resources;
   generating a rewritten URL for each original URL of said identified reference to an access protected remote resource by:
      splitting the original URL into a base part and a resource part;
      generating an authentication identifier by applying an authentication method to said base part and a set of parameters provided by said web application; and
      concatenating the URL of said web application, the base part, authentication identifier, and resource part;
   replacing the original URL of said references contained in said response by said rewritten URL including said authentication identifier; and
   sending said response including rewritten URL and authentication identifier to said client system.

2. The method according to claim 1, further comprising the steps of:
   said web application receiving a client request with a request URL, extracting from said request URL the base part, the authentication identifier, and the resource part;
   applying an authentication validation to said base part for determining whether said base part has not been changed; and
   creating the URL of the remote resource by concatenating the base part and the resource part and granting access to said access protected remote resource only when the authentication validation succeeded.

3. The method according to claim 1, wherein said web application is a portal application.

4. The method according to claim 1, wherein said access protected remote resource is protected by a firewall.

5. The method according to claim 1, wherein said response contains content in a markup language.

6. The method according to claim 1, wherein said authentication method uses a HASH algorithm.

7. The method according to claim 1, wherein said authentication method uses a secret key.

8. The method according to claim 1, wherein said authentication method uses a secret key and a HASH algorithm.

9. The method according to claim 1, wherein said authentication method uses an encryption method.

10. The method according to claim 1, wherein said authentication identifier is extended by a timestamp.

11. The method according to claim 1, wherein at least one of said base part and the authentication identifier is encoded before concatenation.

12. The method according to claim 2, wherein said web application is configured to selectively reject access to a particular protected remote resource depending on the resource part according to the decision of an additional configuration module despite a successful validation of the authentication identifier.

13. A server system in a client-server environment comprising:
   a Web application running on said server system in a client-server environment;
   a communication link to a client system;
   a communication link to an access protected remote resource allowing communication of said Web application with said access protected remote resource;
   a rewriter proxy for identifying references to absolute URLs in said response from said access protected remote resource pointing to access protected remote resources, generating a rewritten URL for each such reference including the URL of said rewriter proxy and replacing the original URL of said reference in said response by said rewritten URL;
   a URL utility module for splitting the original URL into a base part and a resource part and concatenating the base part, an authentication identifier, and the resource part to the rewritten URL before the original URL is replaced by said rewritten URL, and for splitting each URL of each client request into the base part, the authentication identifier, and the resource part to validate the authentication identifier for at least the base part and create the URL of the remote resource from the base part and the resource part; and
   a security module for generating an authentication identifier by applying an authentication method to said base part and a set of parameters provided by said web application and returning said authentication identifier to said URL utility module, and for validating the authentication identifier for the base part and the set of parameters, returning the validation result to the URL utility module, wherein said Web application provides said response including said rewritten URLs to said client system.

14. The server system according to claim 13, wherein said web application is a portal application.

15. The server system according to claim 13, wherein said rewriter proxy, said URL utility module, and said security module are integrated part of said portal application.

16. The server system according to claim 13, wherein said rewriter proxy, said URL utility module, and said security module are implemented in said portal application as a single portlet or integrated portlet.

17. A computer program product stored on a non-transitory computer usable medium comprising computer readable program which when executed on a computer cause said computer to:

receive response from an access protected remote resource in response to a client request to said access protected remote resource, wherein said access protected remote resource is configured in such a way that a client system is not allowed to directly access said access protected remote resource but all client requests are rerouted via a web application which is authorized to access said access protected remote resource;

identify in said response all references that are defined by absolute URLS and point to access protected remote resources;

generate a rewritten URL for each original URL of said identified reference to an access protected remote resource by:

splitting the original URL into a base part and a resource part;

generating an authentication identifier by applying an authentication method to said base part and a set of parameters provided by said web application; and concatenating the URL of said web application, the base part, authentication identifier, and resource part;

replace the original URL of said references contained in said response by said rewritten URL including said authentication identifier; and send said response including rewritten URL and authentication identifier to said client system.

18. The method according to claim 1, wherein said authentication identifier is extended by a nonce.

19. The method according to claim 1, wherein at least one of said base part and the authentication identifier is compressed before concatenation.

* * * * *